(12) United States Patent
Fernando et al.

(10) Patent No.: US 11,366,935 B2
(45) Date of Patent: Jun. 21, 2022

(54) MULTI-USE PAYMENT DEVICE

(71) Applicant: Elo Touch Solutions, Inc., Milpitas, CA (US)

(72) Inventors: Ranil Fernando, Sunnyvale, CA (US); Cameron Cole, Redwood City, CA (US); Fareed Uddin, San Jose, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 81 days.

(21) Appl. No.: 16/527,941

(22) Filed: Jul. 31, 2019

(65) Prior Publication Data

US 2021/0034789 A1   Feb. 4, 2021

(51) Int. Cl.
*G06F 21/74* (2013.01)
*G06Q 20/32* (2012.01)
*G06F 21/84* (2013.01)
*H04W 12/50* (2021.01)

(52) U.S. Cl.
CPC .............. *G06F 21/74* (2013.01); *G06F 21/84* (2013.01); *G06Q 20/3227* (2013.01); *H04W 12/50* (2021.01)

(58) Field of Classification Search
CPC ......... G06F 21/74; G06F 21/84; H04W 12/50
See application file for complete search history.

(56) References Cited

U.S. PATENT DOCUMENTS

| | | | | |
|---|---|---|---|---|
| 9,105,025 B2* | 8/2015 | Poole | ................. | G06Q 20/3224 |
| 9,558,507 B2* | 1/2017 | Zilkha | ................. | G06Q 30/0257 |
| 9,749,308 B2* | 8/2017 | Jones-McFadden | ........................ | H04L 63/105 |
| 10,057,400 B1* | 8/2018 | Gordon | ................... | H04M 1/67 |
| 10,366,378 B1* | 7/2019 | Han | ..................... | G06Q 20/202 |
| 10,437,984 B2* | 10/2019 | Votaw | ................. | H04L 63/1408 |
| 10,496,990 B2* | 12/2019 | Pourfallah | ............ | G06Q 40/02 |
| 2013/0317924 A1* | 11/2013 | Bush | ....................... | H04W 4/80 705/16 |
| 2014/0052532 A1* | 2/2014 | Tsai | ..................... | G06Q 20/382 705/14.51 |

(Continued)

FOREIGN PATENT DOCUMENTS

WO   WO 2019/195676 A1   10/2019

OTHER PUBLICATIONS

International Search Report and Written Opinion of the International Searching Authority directed to related International Patent Application No. PCT/US2020/043861, dated Sep. 30, 2020; 19 pages.

*Primary Examiner* — Viral S Lakhia
(74) *Attorney, Agent, or Firm* — Sterne, Kessler, Goldstein & Fox P.L.L.C.

(57) ABSTRACT

Disclosed herein are system, method, and device embodiments for tablet mode switching. In an embodiment, an electronic device enters a payment mode associated with a secure processor of the electronic device and suspends access by a primary processor of the electronic device to a component of the electronic device. Further, the electronic device determines that it is connected to a docking hub, permits the primary processor to access a peripheral device connected to the docking hub via a pair connection, and receives, by the primary processor, user input from the peripheral device connected to the docking hub via the pair connection.

15 Claims, 5 Drawing Sheets

(56) References Cited

U.S. PATENT DOCUMENTS

| | | | |
|---|---|---|---|
| 2014/0068742 A1* | 3/2014 | Phillips | G07F 7/086 726/7 |
| 2015/0339659 A1* | 11/2015 | Ballesteros | G06Q 20/38215 705/76 |
| 2016/0070964 A1* | 3/2016 | Conrad | H04N 5/232 348/150 |
| 2016/0253649 A1* | 9/2016 | Govindarajan | G06F 1/1633 705/17 |
| 2016/0260073 A1* | 9/2016 | Colnot | G06Q 20/3278 |
| 2017/0161704 A1 | 6/2017 | Rimer | |
| 2017/0178099 A1* | 6/2017 | Truong | G06Q 20/201 |
| 2017/0293577 A1* | 10/2017 | Gomzin | G06F 13/22 |
| 2019/0050844 A1* | 2/2019 | Pan | G06Q 20/3278 |
| 2019/0325437 A1* | 10/2019 | Murray | G06Q 20/322 |

* cited by examiner

MULTI-USE PAYMENT DEVICE

BACKGROUND

Technical Field

The subject matter disclosed herein relates generally to secure payment, and more particularly to permitting secure payment contemporaneously with normal use of an electronic device.

Background

Existing approaches to secure payment via an electronic device typically limit access to input and output components of the electronic device during the secure payment process. For instance, an operating system of the electronic device might not be permitted to access a touch screen of the electronic device during the secure payment process. As such, a user of the electronic device will be prevented from utilizing other functions of the electronic device during the secure payment process. As a result, the user's ability to multi-task and/or efficiently employ their electronic device is significantly reduced.

SUMMARY

Provided herein are system, apparatus, device, method and/or computer program product embodiments, and/or combinations and sub-combinations thereof, for tablet mode switching.

An example method embodiment may include steps for implementing tablet mode switching. Steps of the method may include entering, by an electronic device, a payment mode associated with a secure processor of the electronic device; suspending access, by a primary processor of the electronic device, to a component of the electronic device; determining that the electronic device is connected to a docking hub; permitting the primary processor to access a peripheral device connected to the docking hub via a pair connection; and receiving, by the primary processor, user input from the peripheral device connected to the docking hub via the pair connection.

An example apparatus embodiment may include a touch-sensitive display; a connection interface; one or more memory components including a payment application and a system application; and one or more processors and/or circuits coupled to the memory components. Further, the processors may be configured to execute the system application on a primary processor of the processors; suspend access, by the primary processor, to the touch-sensitive display; execute, in a payment mode, the payment application via a secure processor of the one processors; determine that the electronic device is connected to a docking hub via the connection interface; and display, on a touch display of the docking hub, information associated with the system application.

Another example apparatus embodiment may include instructions stored thereon that, when executed by at least one computing device, causes the computing device to perform operations for tablet mode switching. The operations may include entering, by an electronic device, a payment mode associated with a secure processor of the electronic device; suspending access, by a primary processor of the electronic device, to a component of the electronic device; determining that the electronic device is connected to a docking hub; permitting the primary processor to access a peripheral device connected to the docking hub via a pair connection; and receiving, by the primary processor, user input from the peripheral device connected to the docking hub via the pair connection.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing tablet mode switching.

Figure 1:
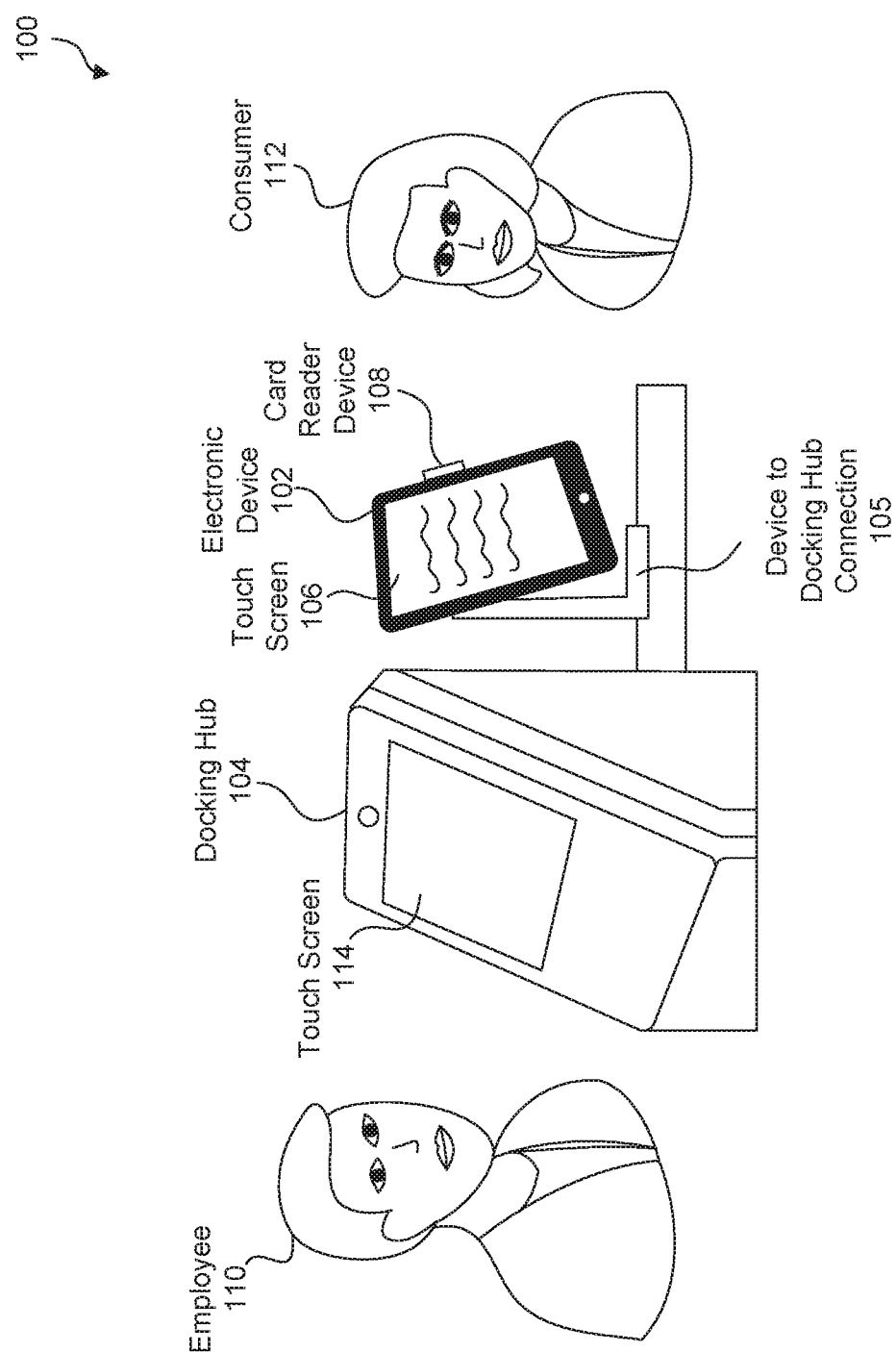
FIG. 1 is a diagram of an example system for implementing tablet mode switching, according to some embodiments.

FIG. 1 is a block diagram of a device system 100 implementing tablet mode switching, according to some embodiments. FIG. 1 illustrates an electronic device 102 and a docking hub 104 configured to connect with the electronic device 102 via a device-to-docking hub connection 105 (e.g., a universal serial bus type C (USB-C) connection). Some examples of the electronic device 102 include, but are not limited to, tablets, smartphones, mobile devices, personal computers, laptop computers, appliances, internet of things (IoT) devices, wearables, etc. In some embodiments, the electronic device 102 may be a device configured to present audio information, graphical content, videos, websites, and media streams. Additionally, some examples of the docking hub 104 include kiosks, point of sale stations, or any other device connectable to the electronic device 102 and including display functionality and/or user input functionality (e.g., a touch screen, a keyboard, a mouse, a voice dictation interface, etc.).

As illustrated in FIG. 1, the electronic device 102 may include a touch screen interface 106 and a card reader device 108. In some embodiments, the card reader device 108 may include at least one of a magnetic strip reader (MSR), an EMV card reader, a contactless payment device, a smart card reader, and so forth. Further, the electronic device 102 may be configured to provide one or more applications. For example, the electronic device 102 may include a shopping application for managing the purchase of items sold at a retail establishment associated with the electronic device 102. Additionally, the electronic device 102 may include a payment application for processing payment information associated with a financial card (e.g., a credit card, a debit card, a rewards card, etc.) read by the card reader device 108 in connection with a purchase order at the retail establishment.

In some embodiments, an employee 110 may use the electronic device 102 to assist a consumer 112 in purchasing one or more items from the retail establishment. For instance, the consumer 112 may endeavor to purchase a set of composition notebooks from the retail establishment. As such, the employee 110 may select the set of composition notebooks within the shopping application via the touch screen interface 106. Once the set of composition notebooks has been selected, the employee 110 or the consumer 112 may cause the electronic device 102 to enter a secure payment mode for receiving payment information from the consumer 112. For example, the employee 110 may select a control (e.g., a virtual button), presented within a graphical user interface (GUI) of the electronic device 102 that causes the electronic device 102 to enter a secure payment mode.

Within the secure payment mode, a secure processor of the electronic device 102 may possess exclusive access to the touch screen interface 106 and execute the payment application to facilitate receipt of payment for the set of composition notebooks. As a result, the shopping application may no longer access the touch screen interface 106 of the electronic device 102. In some embodiments, the payment application may perform a payment workflow in the secure payment mode. For instance, the payment application may request the consumer 112 swipe a debit card in the card reader device 108 to obtain payment information and provide an authentication personal identification number (PIN) code to the payment application via the touch screen interface 106. In addition, the payment workflow may present graphical information on the touch sensitive interface 106 for entering the PIN code. For example, the payment workflow may present a virtual PIN entry control including alpha numeric elements within a GUI. Further, the payment application may validate the payment information and authentication PIN code. By including PIN code entry via the electronic device 102, the identity of the consumer 112 may be ascertained without intervention of the employee 110. However, as described herein, the security of the PIN code is subject to strict controls, as promulgated by the payment card industry (PCI) data security standard (DSS) among other domestic and international standards, designed to substantially reduce the ability to compromise PIN codes through an attack on the electronic device 102.

As illustrated in FIG. 1, the docking hub 104 may be connected to a touch screen interface 114. Further, as described in detail herein, the electronic device 102 may be paired with the docking hub 104 while in the secure payment mode. In response, the shopping application may continue its execution on the primary processor of the electronic device 102. Additionally, the employee 110 may utilize the shopping application via the touch screen interface 114 connected to the docking hub 104, while the consumer 112 employs the touch interface 106 to complete the payment workflow of the payment application. As such, the electronic device 102 may be able to securely provide payment processing via the secure processor while contemporaneously providing other functionality of the electronic device 102 via the primary processor.

Figure 2:
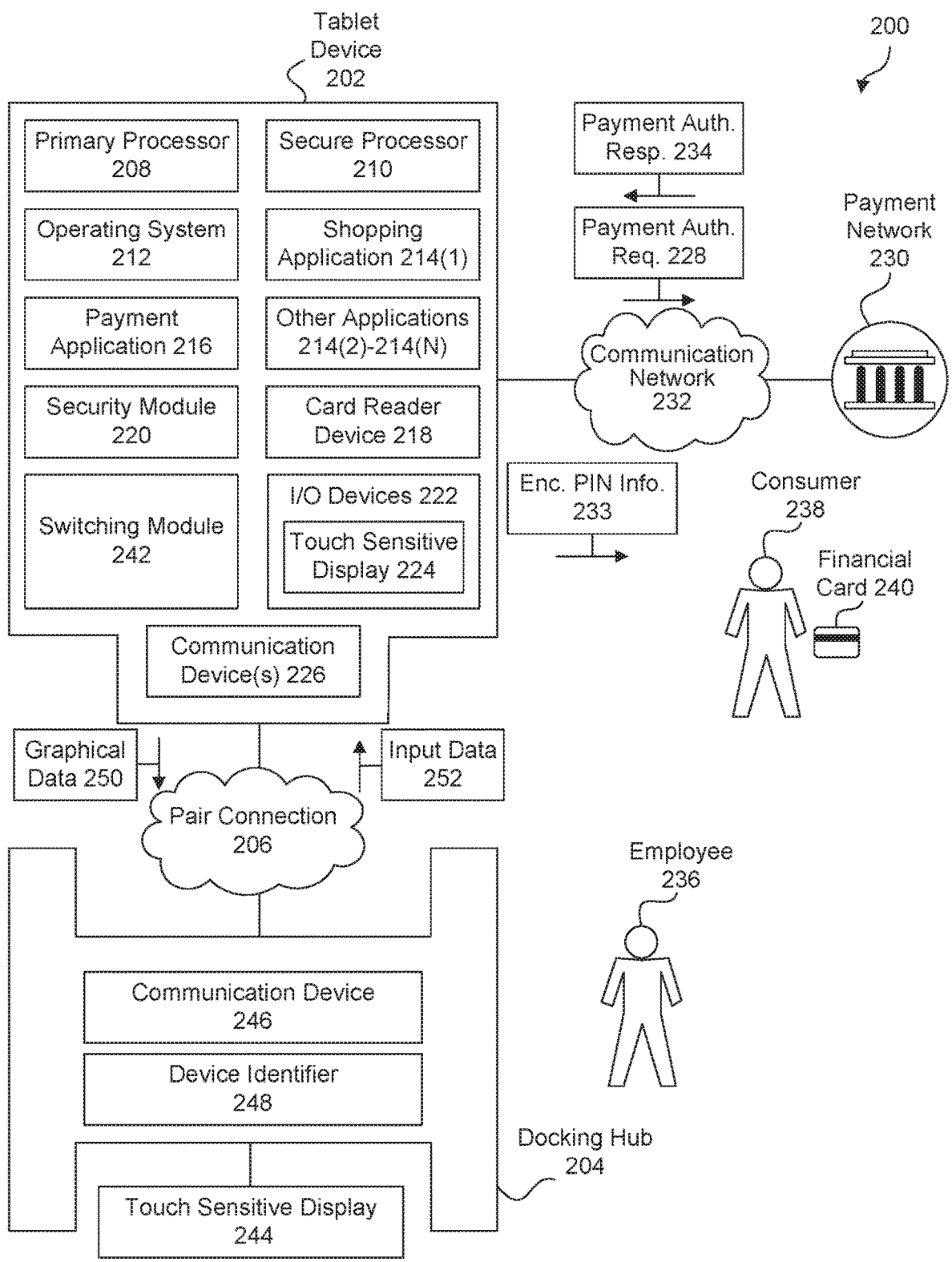
FIG. 2 is a block diagram of an example system for implementing tablet mode switching, according to some embodiments.

FIG. 2 is a block diagram of a device system 200 implementing tablet mode switching, according to some embodiments. FIG. 2 illustrates a tablet device 202 and a docking hub 204 connected via a pair connection 206. In some embodiments, the tablet device 202 and the docking hub 204 may be electronic devices that are distributed to customer operated and owned locations, such as retail establishments. Further, the tablet device 202 may provide access to information associated with products and/or services provided in the retail establishments. Further, the tablet device 202 may be used by employees and consumers within the retail establishments to facilitate the purchase of goods or services from the retail establishments.

As illustrated in the example of FIG. 2, the tablet device 202 may include a primary processor 208, a secure processor 210, an operating system 212, one or more applications 214(1)-(N), a payment application 216, a card reader device 218, a security module 220, input/output (I/O) devices 222 (e.g., a touch sensitive display 224), and a communication device 226. In various embodiments, the tablet device 202 may be any type of electronic device including but not limited to smartphones, mobile devices, personal computers, laptop computers, appliances, internet of things (IoT) devices, wearables, etc., or any other type of device or computing system capable of performing secure payment processes.

As referred to herein, in some embodiments, a "processor" may refer to circuitry and/or logic capable of executing processes and/or procedures according to machine-readable instructions. For example, a processor may retrieve machine-readable instructions from a storage medium, execute processes for processing signals based at least in part on the retrieved instructions and provide a result based at least in part on the processed data. The processor may be embedded on an integrated circuit to support specific predetermined functionality. In some embodiments, a processor may be characterized as a "controller," "microcontroller," "microprocessor" and/or other programmable logic device capable of executing instructions.

The primary processor 208 may execute the operating system 212 and the applications 214(1)-(N). The operating system 212 may be an application program configured to manage the basic functions of the tablet device 202. For instance, the operating system 212 may be configured to schedule tasks, manage storage of data on the tablet device 202, provide common services to the applications 214(1)-(N), and communicate with peripheral devices. Some examples of the operating system 212 may include Google's Android™ operating system, Microsoft's Windows™ operating system, Apple's Mac OS/X® or iOS operating systems, some variety of the Linux operating system, or the like.

As used herein, and in some embodiments, an "application" may refer to any application or software (e.g., client, agent, application, mobile application, web application, hybrid application, computer program, desktop application, or module) operable to run on the tablet device 202. For example, the application 214(1) may be a shopping application for purchasing items sold at a retail establishment associated with the tablet device 202. Some other examples of applications 214(1)-(N) include inventory management software, customer relationship management software, financials administration software, and warehouse management software.

As used herein, in some embodiments, a "secure processor" may refer to a cryptographic processor coupled to at least one of a secure storage random-number generator, secure storage including secure firmware and/or encryption/decryption keys, or tamper detection sensors. Further, the secure firmware may include the payment application 216, an encryption/decryption method using the encryption/decryption keys, and one or more authentication methods. Additionally, in some embodiments, the secure processor 210 may be configured with tamper-proof functionality, anti-eavesdropping functionality, sensitive access protection, and an auto-erase function. An example of a secure processor includes a secure microcontroller.

Additionally, the secure processor 210 may execute the payment application 216. Further, the payment application 216 may be configured to process payment information via one or more steps of a payment workflow. In some embodiments, the payment workflow may include steps for determining a consumer's financial information, determining whether a financial card is a debit card or a credit card, sending a payment authorization request 228 to a payment network 230 (e.g., an electronic funds transfer point of sale network) via a communication network 232, requesting input of pin information (e.g., a PIN code) associated with the financial card via the input/output (I/O) devices 222 (e.g., the touch sensitive display 224), encrypting the pin information, sending the encrypted pin information 233 to the payment network 230 via the communication network 232, and receiving a payment authorization response 234 corresponding to the payment authorization request 228 via the communication network 232. Additionally, the payment network 230 may determine the payment authentication response 234 based on verifying the financial account associated with the financial card has the necessary funds to complete the transaction, and verifying that the pin information corresponds to the financial card.

The communication network 232 may include any combination of a private network, personal area network (PAN), Local-Area Network (LAN), Wide-Area Network (WAN), or the Internet. Further, the connection between the tablet device 202, the docking hub 204, the payment network 230, and the communication network(s) 232 may be a wireless connection (e.g., Bluetooth or other short range wireless technology, cellular, Wi-Fi connection, etc.), or a wired connection (e.g., Ethernet, universal serial bus (USB), etc.), or a combination thereof. In some embodiments, the tablet device 202, the docking hub 204, and the payment network 232 may employ one or more communication protocols to send and receive information over the communication network 232.

In some embodiments, the payment information may correspond to a financial account and/or financial card (e.g., a credit card, a debit card, a rewards card, etc.). Further, the payment information may be obtained from the financial card via the card reader device 218 or another peripheral of the tablet device 202. For example, an employee or consumer within the retail establishment may cause the card reader device 218 to read a financial card to obtain to the payment information. In some other examples, the payment information may be obtained from a financial card or a device associated with the financial card via contact or contactless communication, e.g., radio-frequency identification, near-field communication, etc. In yet still some other examples, the payment information may be manually entered in to the tablet device 202 via the input/output (I/O) devices 222 (e.g., the touch sensitive display 224).

Further, the secure processor 210 may execute the payment application within a secure payment mode. Within the secure payment mode, the primary processor 208 may not be provided access to the touch sensitive display 224. As a result, the tablet device 202 substantially reduces the risk of a malicious actor obtaining unauthorized access to PIN codes through an attack. In some embodiments, the secure payment mode may abide by protocols and/or practices set forth by domestic and/or international security organizations. For example, as described above, the secure payment mode may operate in accordance with PCI standards (e.g., PCI DSS, PCI pin transaction security (PTS), etc.).

For example, an employee 236 may utilize the shopping application of the tablet device 202 to organize the purchase of a set of composition notebooks. Further, the employee 236 may indicate to the shopping application that the employee 236 is done selecting items for purchase and prepared to begin the payment process. As a result, the shopping application 214(1) may call for the execution of a payment workflow of the payment application 216 via the secure processor 210. During the payment workflow, the payment application 216 may request that the employee 236 or the consumer 238 swipe a financial card 240 of the consumer 238. In addition, the payment application 216 may request that the consumer 238 enter a PIN code associated with the financial card 240 via the touch sensitive display 224.

Further, given that the tablet device 202 is operating within the secure payment mode, the touch sensitive display 224 may be inaccessible to the primary processor 208 and the shopping application 216. As such, the shopping application 216 may be unable to display information to the touch sensitive display 224. In addition, the shopping application 216 may be unable to access the PIN code information input by the consumer 238 via the touch sensitive display 224.

In some embodiments, the tablet device 202 may employ a switching module 242 (e.g., an analog switch) to switch between the normal operation mode of the tablet device 202 and the secure payment mode of the tablet device 202. For example, when the tablet device 202 enters the secure payment mode, the switching module 242 may disable access by the primary processor 208 to one or more of the I/O devices 222, e.g., the touch sensitive display 224. Thereby preventing access by the operating system 212 and/or applications 214(1)-(N) to the touch sensitive display 224. Further, the switching module 242 may ensure that input data 250 captured at the touch sensitive display 224 is routed to the secure processor 210, and graphical data 252 generated by the payment application 216 is routed to the touch sensitive display 224. Additionally, when the payment application 216 completes one or more steps of the payment workflow, the switching module 242 may switch back to the normal operation mode from the secure payment mode and re-enable access by the primary processor 208 to the touch sensitive display 224.

In some embodiments, prior to the switch from the normal operation mode to the secure payment mode, the operating system 212 or one of the applications 214(1)-(N) may determine a context of the normal operation mode of the tablet device 202. For example, the operating system 212 may determine the applications currently executing on the primary processor 208 and the graphical information currently displayed on the touch sensitive display 224. Additionally, the operating system 212 may store or otherwise maintain the context while the tablet device 202 is in the secure payment mode.

The docking hub 204 may include or be connected to a touch sensitive display 244. For instance, the docking hub 204 may be connected to the touch sensitive display 244 via a USB-C connection or a high-definition multimedia interface (HDMI) connection. In addition, the docking hub 204 may include a communication device 246, and a device identifier 248. As illustrated in FIG. 2, the tablet device 202 and the docking hub 204 may be paired via the pair connection 206. For instance, the communication device 226 and the communication device 246 may establish the pair connection 206 between the tablet device 202 and the docking hub 204. The pair connection 206 may be a wired or wireless personal area network employing at least one of USB, FireWire, Wi-Fi, Bluetooth, ultra-wide band, Z-Wave, ZigBee, Thread, or any other capable technology. For example, the pair connection 206 may be a USB-C connection. As such, the communication device 226 may be a USB-C male interface and the communication device 246 may be a USB-C female interface, or vice versa. As another example, the communication device 226 and the communication device 246 may be wireless devices, and the pair connection 206 may be a wireless channel capable of transmitting graphical information from the tablet device 202 to the docking hub 204, and/or input data captured at the docking hub 204 to the tablet device 202. Further, the tablet device 202 can connect (i.e., dock) or disconnect (i.e., undock) from the docking hub 204 via a wireless pair connection 206 using a proximity sensor and/or software switch.

In some embodiments, when the tablet device 202 is in secure payment mode and the pair connection 206 has been established, the tablet device 202 may permit the primary processor 208 to utilize the touch sensitive display 244 of the docking hub 204. For example, graphical data associated with the operating system 212 and/or the applications 214 (1)-(N) may be displayed on the touch sensitive display 244. In some instances, the operating system 212 may identify the context associated with the last state of the normal operating mode, and restore the context using the primary processor 208 and the touch sensitive display 244. For example, the graphical information displayed on touch sensitive display 224 by the applications 214(1)-(N) in the context may be displayed on the touch sensitive display 244.

Further, the employee 236 may provide input to the operating system 212 and/or the applications 214(1)-(N) via the touch sensitive display 244. As such, the employee 236 may continue to operate the tablet device 202 while the consumer 238 securely completes the payment workflow in the secure payment mode without risking compromising the secrecy of the PIN code or any other payment information associated with the consumer 238.

Further, when the consumer 238 completes at least one step of the payment workflow, the switching module 242 may switch the tablet device 202 back to the normal operating mode from the secure payment mode. For example, the switching module 242 may re-enable access by the primary processor 208 to the I/O devices (e.g., the touch sensitive display 224). In other words, the switching module 242 may ensure that input data captured at the touch sensitive display 224 is routed to the primary processor 208, and graphical data generated by the operating system 212 or the applications 214(1)-(N) is routed to the touch sensitive display 224. In some embodiments, prior to the switch from the secure payment mode to the normal operation mode, the operating system 212 or one of the applications 214(1)-(N) may determine a context of the normal operation mode of the tablet device 202. For example, the operating system 212 may determine the graphical information currently displayed on the touch sensitive display 244. Additionally, the operating system 212 may display the graphical information on the touch sensitive display 224 after the switch from the secure payment mode to normal operating mode.

In some embodiments, the security module 220 may verify the docking hub 204 using the device identifier 248 of the docking hub 204. Further, if the security module 220 determines that the docking hub 204 is an authorized device, the security module 220 may permit the tablet device 202 and the docking hub 204 to form the pair connection 206. If the security module 220 determines that the docking hub 204 is unauthorized device, the security module 220 may prevent formation of the pair connection 206. In other words, the security module 220 may prevent transmission of the graphical data 250 and/or the input data 252 between the tablet device 202 and the docking hub 204 when the docking hub 204 is not an authorized device.

In some examples, the device identifier 248 may be assigned to the tablet device 202 at the time the tablet device 202 is manufactured in a manufacturing facility. In some other instances, the device identifier 248 is assigned to hardware and/or software installed on the tablet device 202. For example, an administrator may purchase software and install the software on the tablet device 202. As a result, the identifier of the software may become the device identifier 248 of the docking hub 204. In some embodiments, the device identifier 248 may be a vendor identifier common to electronic devices manufactured by the vendor or a unique identifier particular to the docking hub 204.

Further, in some embodiments, the docking hub 204 may recharge a battery of the tablet device 202, and/or provide power for operating the tablet device 202 for extended periods. For example, the docking hub 204 may provide power to the tablet device via the USB-C connection (i.e., the pair connection) between the tablet device 202 and docking hub 204.

Further, in some embodiments, the docking hub 204 may be a point of sale device configured to facilitate payment processes. Consequently, the tablet device 202 and docking hub 204 may each be configured to independently facilitate financial transactions.

Figure 3:
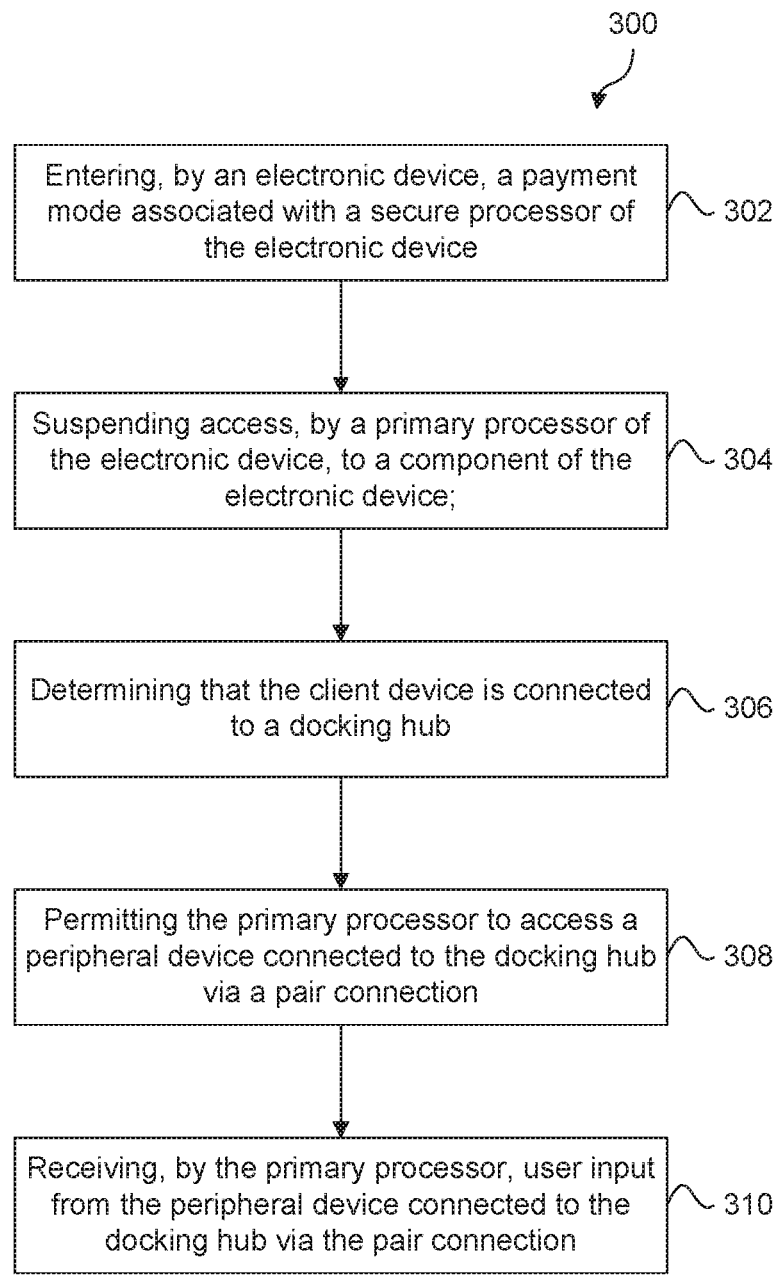
FIG. 3 is a flowchart illustrating a process for implementing tablet mode switching, according to some embodiments.

FIG. 3 is a flowchart for a method 300 for a process for implementing zero touch deployment and dynamic configuration in a managed device system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3 as will be understood by a person of ordinary skill in the art.

Method 300 shall be described with reference to FIGS. 1 and 2. However, method 300 is not limited to that example embodiment.

In 302, the electronic device may enter a payment mode associated with a secure processor of the electronic device. For instance, the employee 236 may utilize the shopping application 214(1) of the tablet device 202 to organize the purchase of a set of composition notebooks. Further, the employee 236 may indicate to the shopping application 214(1) that the consumer 238 is done shopping and prepared to begin the payment process by selecting a control of a graphical user interface associated with the shopping application 214(1). As a result, the shopping application 214(1) may call for the execution of a payment workflow of the payment application 216 via the secure processor 210 within a secure payment mode.

Further, the payment workflow may request the consumer 238 provide PIN code information associated with the financial card 240 read by the card reader device 218. For example, the payment workflow may present graphical information on the touch sensitive display 224 including a virtual PIN entry control comprising alpha numeric elements. Additionally, the payment workflow may receive the PIN code information via the touch sensitive display 224, and validate the PIN code.

In some embodiments, the switching module 242 may switch the tablet device 202 from a normal operation mode to the secure payment mode. Further, prior to the switch from the normal operation mode to the secure payment mode, the operating system 212 or one of the applications 214(1)-(N) may determine a context of the normal operation mode of the tablet device 202. For example, the operating system 212 may determine the applications currently executing on the primary processor 208 and the graphical information currently displayed on the touch sensitive display 224. Additionally, the operating system 212 may store or otherwise maintain the context while the tablet device 202 is in the secure payment mode.

In 304, the electronic device may suspend access, by a primary processor of the electronic device, to a component of the electronic device. For instance, the tablet device 202 may suspend access by the primary processor 208 to the one or more of the I/O devices 222 (e.g., the touch sensitive display 224). In some embodiments, the switching module 242 may render the touch sensitive display 224 inaccessible to the primary processor 208 and the software programs (e.g., the operating system 212 or the applications 214(1)-(N)) executing on the primary processor 208.

In 306, the electronic device may determine that the electronic device is connected to a docking hub. For example, the tablet device 202 may operate an event listener that detects that the tablet device 202 has been connected to or may be connected to the docking hub 204. In response, the tablet device 202 and the docking hub 204 may form the pair connection 206 via the communication device 226 and the communication device 246.

As described herein, in some embodiments, the security module 220 may permit the tablet device 202 to form the pair connection 206 based upon determining that the docking hub 204 is an authorized device. For instance, the docking hub docking hub 204 may send the device identifier 248 to the tablet device 202. Upon receipt of the device identifier 248, the security module 220 may determine whether the docking hub 204 is an authorized device based on the device identifier 248. In some examples, the security module 220 may compare the device identifier 248 to a whitelist and/or blacklist of device identifiers. In some other examples, the security module 220 may evaluate whether device identifier 248 matches an expected format associated with valid device identifiers.

In some embodiments, the tablet device 202 may determine that a connection (e.g., a physical connection) exists or is available with the docking hub 204 prior to entering the secure payment mode. In some other embodiments, the tablet device 202 may determine that a connection (e.g., a physical connection) exists or is available with the docking hub 204 after entering the secure payment mode. For example, the docking hub 204 may receive the tablet device 202 after the tablet device 202 has entered the secure payment mode.

In 308, the tablet device may permit the primary processor to access a peripheral device connected to the docking hub. For example, tablet device 202 may permit software programs executing on the primary processor 208 to send the graphical data 250 to the touch sensitive display 244 of the docking hub 204. In some embodiments, the switching module 242 may route the graphical data 250 from the primary processor 208 to the communication device 226 for transmission to the touch sensitive display 244 via the pair connection 206 and the communication device 246.

In some embodiments, the operating system 212 may identify a context of the normal operating mode determined prior to entering the secure payment mode. Further, the operating system 212 may restore the context via the primary processor 208 and the touch sensitive display 244.

In 310, the tablet device may receive, by the primary processor, user input from the peripheral device connected to the docking hub. For example, tablet device 202 may permit software programs executing on the primary processor 208 to receive the input data 252 from the touch sensitive display 244 of the docking hub 204. In some embodiments, the switching module 242 may route the input data 250 to the primary processor 208 from the pair connection 206 via the communication device 226.

Figure 4B:
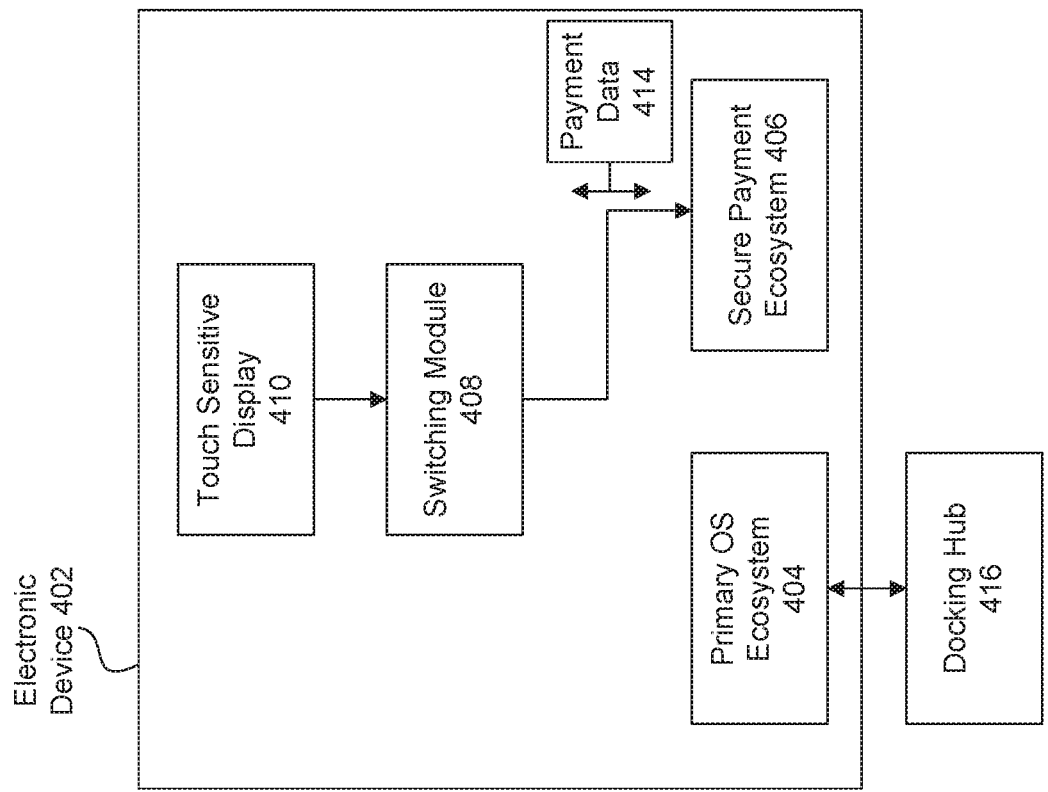
FIGS. 4A-4B are block diagrams of an example device for implementing tablet mode switching, according to some embodiments.
Figure 4A:
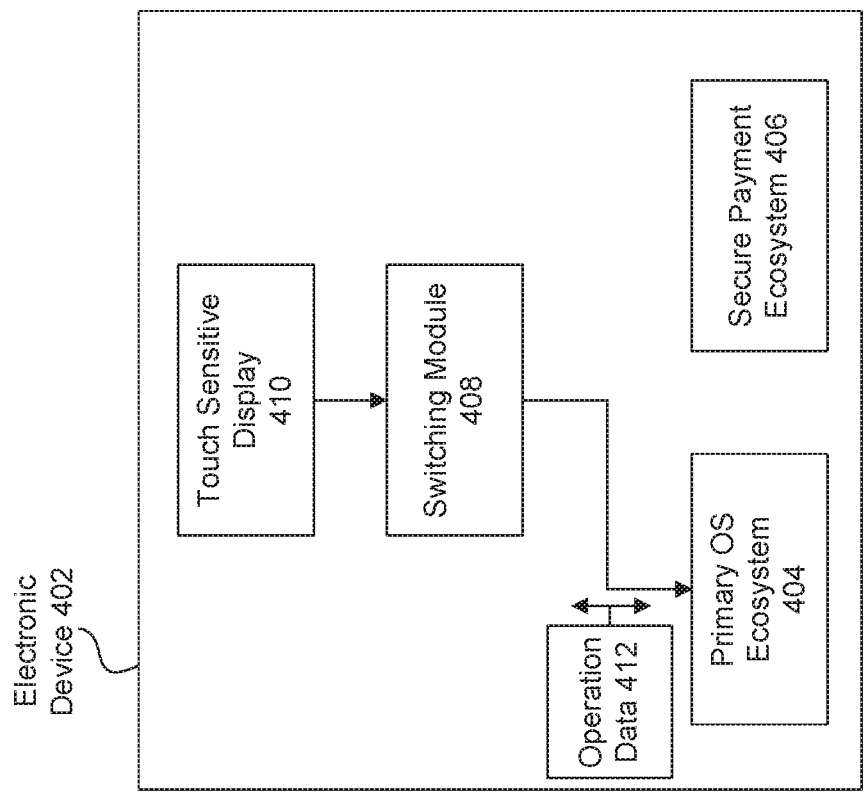

FIGS. 4A-4B illustrate an example device 402 for implementing tablet mode switching, according to some embodiments. As illustrated in FIGS. 4A-4B, the electronic device 402 (e.g., the electronic device 202) may include a primary operating system (OS) ecosystem 404 (e.g., the primary processor 208, the operating system 212, and the applications 214(1)-(N)), a secure payment ecosystem 406 (e.g., the secure processor 210, and the payment application 216), a switching module 408 (e.g., the switching module 242), and a touch sensitive display 410 (e.g., the touch sensitive display 224).

Further, FIG. 4A illustrates the electronic device 402 in a normal operating mode wherein the switching module 408 routes operation data 412 between the primary OS ecosystem 404 and the touch sensitive display 410. FIG. 4B illustrates the electronic device 402 in a secure payment mode wherein the switching module 408 routes payment data 412 between the secure payment ecosystem 404 and the touch sensitive display 410. As described in detail herein, the components of the primary OS ecosystem 404 may be prevented from accessing the touch sensitive display 410 in the secure payment mode. In other words, access to the touch sensitive display 410 may be restricted to the components of the secure payment ecosystem 406. Further, the switching module 408 may control whether the electronic device 402 is in the normal operating mode or the secure payment mode. In addition, when the electronic device 402 is in the secure payment mode, the primary OS ecosystem 404 may access a docking hub 416 or peripheral devices connected to the docking hub 416, as further described herein.

Figure 5:
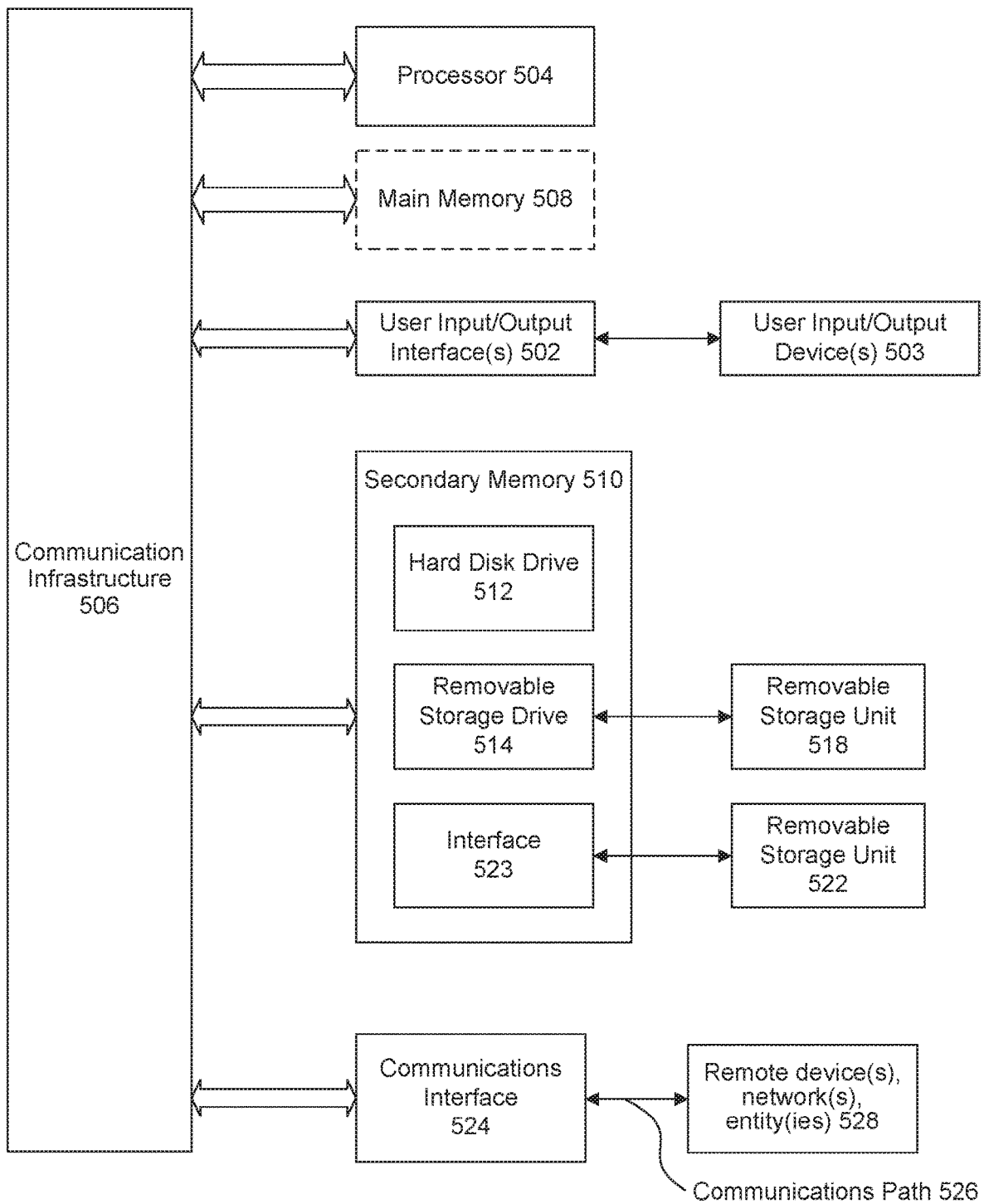
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, touch-sensitive displays, card reader devices, microphones, cameras, motion sensors, location sensors, NFC reader devices, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing device applications and/or other instructions and/or data to be accessed by computer system 500. Such means, devices, components, instrumentalities or other approaches may include, for example, a removable storage unit 522 and an interface 523. Examples of the removable storage unit 522 and the interface 523 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    entering, by an electronic device, a payment mode associated with a secure processor of the electronic device;
    suspending access, by an application executing on a primary processor of the electronic device, to a component of the electronic device, wherein the component of the electronic device includes at least one of a display device or a user input device and wherein the payment mode comprises restricting access to the at least one of the display device or the user input device by a payment application executing on the secure processor;
    determining that the electronic device is connected to a docking hub;
    permitting the application access to a peripheral device connected to the docking hub via a pair connection;
    receiving, by the primary processor, user input from the peripheral device connected to the docking hub via the pair connection, wherein the user input is associated with the application;
    entering a normal operating mode associated with the primary processor based on completion of a step of a payment workflow associated with the payment mode; and
    re-enabling access by the primary processor to the component of the electronic device.

2. The method of claim 1, wherein the peripheral device includes a graphical display, and further comprising:
    displaying graphical information associated with an application executing on the primary processor on the graphical display.

3. The method of claim 1, wherein entering the payment mode comprises performing one or more steps of a payment workflow via a payment application executing on the secure processor.

4. The method of claim 1, further comprising:
    determining that the docking hub is an authorized device based on a device identifier associated with the docking hub; and
    forming the pair connection with the docking hub based on the determining.

5. The method of claim 1, wherein the peripheral device connected to the docking hub includes at least one of a display device or a user input device.

6. An electronic device comprising:
    a touch-sensitive display;
    a connection interface;
    one or more memory components including a payment application and a system application; and
    one or more processors and/or circuits coupled to the one or more memory components, and configured to:
        execute the system application on a primary processor of the one or more processors;
        suspend access, by the system application on the primary processor, to the touch-sensitive display;
        execute, in a payment mode, the payment application via a secure processor of the one or more processors, wherein the payment mode comprises restricting access to the touch-sensitive display by a payment application executing on the one or more processors;
        determine that the electronic device is connected to a docking hub via the connection interface;
        permit the system application access to a peripheral device connected to the docking hub via the connection interface;
        display, on a touch display of the peripheral device, information associated with the system application;
        enter a normal operating mode associated with the primary processor based on completion of a step of a payment workflow associated with the payment mode; and
        re-enable access by the primary processor to the touch-sensitive display.

7. The electronic device of claim 6, wherein the connection interface is a universal serial bus type C interface.

8. The electronic device of claim 6, wherein the connection interface is a wireless interface.

9. The electronic device of claim 6, wherein the information is first information, and the one or more processors and/or circuits are further configured to:
    display, on the touch-sensitive display, second information associated with the system application.

10. The electronic device of claim 6, wherein the one or more processors and/or circuits are further configured to:
    receive a device identifier from the docking hub;
    determine that the docking hub is an authorized device via the device identifier; and
    form a pair connection with the docking hub via the connection interface based on the determining.

11. A non-transitory computer-readable device having instructions stored thereon that, when executed by at least one computing device, cause the at least one computing device to perform operations comprising:
    entering, by an electronic device, a payment mode associated with a secure processor of the electronic device;
    suspending access, by an application executing on a primary processor of the electronic device, to a component of the electronic device, wherein the component of the electronic device includes at least one of a display device or a user input device and wherein the payment mode comprises restricting access to the at least one of the display device or the user input device by a payment application executing on the secure processor;
    determining that the electronic device is connected to a docking hub;
    permitting the application access to a peripheral device connected to the docking hub via a pair connection;
    receiving, by the primary processor, user input from the peripheral device connected to the docking hub via the pair connection, wherein the user input is associated with the application;

entering a normal operating mode associated with the primary processor based on completion of a step of a payment workflow associated with the payment mode; and re-enabling access by the primary processor to the component of the electronic device.

12. The non-transitory computer-readable device of claim 11, wherein the peripheral device connected to the docking hub includes a graphical display and the operations further comprising:

displaying graphical information associated with an application executing on the primary processor on the graphical display.

13. The non-transitory computer-readable device of claim 11, the operations further comprising:

entering a normal operating mode associated with the primary processor based on completion of a step of a payment workflow associated with the payment mode; and re-enabling access by the primary processor to the component of the electronic device.

14. The non-transitory computer-readable device of claim 11, wherein entering the payment mode comprises performing one or more steps of a payment workflow via a payment application executing on the secure processor.

15. The non-transitory computer-readable device of claim 11, the operations further comprising:

determining that the docking hub is an authorized device based on a device identifier associated with the docking hub; and forming the pair connection with the docking hub based on the determining.

* * * * *